(12) United States Patent
Yen et al.

(10) Patent No.: US 12,388,829 B1
(45) Date of Patent: Aug. 12, 2025

(54) ENTERPRISE APPLICATION MANAGEMENT AND MIGRATION ON A WEB PROXY

(71) Applicant: Morgan Stanley Services Group Inc., New York, NY (US)

(72) Inventors: Gordon Yen, Taipei (TW); Hilal Khan, New York, NY (US); Rongfeng Zhou, Singapore (SG)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/044,171

(22) Filed: Feb. 3, 2025

(51) Int. Cl.
*H04L 9/40* (2022.01)

(52) U.S. Cl.
CPC ........ *H04L 63/101* (2013.01); *H04L 63/0281* (2013.01)

(58) Field of Classification Search
CPC .......................... H04L 63/101; H04L 63/0281
See application file for complete search history.

(56) References Cited

U.S. PATENT DOCUMENTS

| | | | |
|---|---|---|---|
| 6,606,708 | B1 | 8/2003 | Devine et al. |
| 7,458,082 | B1 | 11/2008 | Slaughter et al. |
| 10,728,252 | B2 * | 7/2020 | Desai ................... H04L 63/029 |
| 10,958,662 | B1 * | 3/2021 | Sole .................... H04L 63/0853 |
| 11,120,125 | B2 | 9/2021 | Coleman et al. |
| 11,240,207 | B2 | 2/2022 | Coleman et al. |
| 2012/0084184 | A1 * | 4/2012 | Raleigh ................. H04W 48/16 709/224 |
| 2012/0291009 | A1 | 11/2012 | Khare et al. |
| 2012/0317236 | A1 | 12/2012 | Abdo et al. |
| 2016/0164826 | A1 * | 6/2016 | Riedel ................. H04L 43/0876 709/223 |
| 2016/0308885 | A1 | 10/2016 | McDougal |
| 2017/0012988 | A1 | 1/2017 | Turgeman et al. |
| 2017/0331859 | A1 * | 11/2017 | Bansal ................. H04L 63/029 |
| 2019/0095646 | A1 | 3/2019 | Goodridge |
| 2020/0296139 | A1 * | 9/2020 | Fainberg ............... H04L 63/205 |
| 2021/0392111 | A1 * | 12/2021 | Sole .................... H04L 63/1416 |
| 2022/0103526 | A1 | 3/2022 | Niemi et al. |
| 2022/0200962 | A1 | 6/2022 | Nilekar |
| 2022/0210173 | A1 * | 6/2022 | Katmor ............... H04L 63/1416 |
| 2022/0278960 | A1 * | 9/2022 | Mitchell ............. H04L 63/0236 |

(Continued)

*Primary Examiner* — Aftab N. Khan
(74) *Attorney, Agent, or Firm* — Leason Ellis LLP (57) ABSTRACT

A computer-implemented method for management of an application on an enterprise network which accesses external networks via a web proxy. The method comprises obtaining enriched metadata concerning an application executed on the enterprise network, the enriched metadata including at least source code information and ownership information, identifying application traffic on the enterprise network based on proxy log data, source IP and destination URL, generating an access control list (ACL) based on the enriched metadata and identified application traffic, the ACL including a source address of the application and a list of allowed destination addresses, converting the ACL into a proxy policy that can be processed by a web proxy to permit access by the application to the destination addresses in the ACL, and establishing data communication between the application and an external network based on the proxy policy.

11 Claims, 4 Drawing Sheets

(56) References Cited

U.S. PATENT DOCUMENTS

| | | | | |
|---|---|---|---|---|
| 2022/0303244 A1* | 9/2022 | Wondra | .............. | H04L 63/0236 |
| 2024/0129321 A1* | 4/2024 | Howe | ..................... | H04L 63/20 |
| 2024/0235996 A1* | 7/2024 | Miklós | .................... | H04L 45/02 |
| 2024/0394068 A1* | 11/2024 | Ambaljeri | ............... | H04L 41/08 |

* cited by examiner

ENTERPRISE APPLICATION MANAGEMENT AND MIGRATION ON A WEB PROXY

FIELD OF THE DISCLOSURE

The present disclosure relates to organizational web security systems, and more particularly, relates to a system and method for enterprise application management and migration on a web proxy.

BACKGROUND OF THE DISCLOSURE

Web proxies are used to protect organizations from external security threats and data loss while accessing the internet. A web proxy is a platform that forms an intermediate layer between the user and the internet. Each web proxy is configured with a web security control policy that governs how incoming and outbound application traffic is protected by interception and filtration. As an example, a web proxy can be configured to prevent users within an organization from accessing certain sites and domains of the web. Organizations can employ additional web traffic controls including, but not limited to, Data Loss Prevention (DLP), Anti-Virus scanning (AV), ZTNA (Zero Trust Network Access), sandboxing, and content analysis. These additional controls work in conjunction with web proxies to offer protection against external threats.

It is a challenge to effectively govern and monitor application traffic. Generally, access to traffic is governed according to the least privileged access principle. This principle maintains that a user or entity should only have access to the specific data, resources and applications needed to complete a required task. Strict adherence to the least privileged access can be inefficient since access to the Internet or other external networks can be useful for users and applications beyond the specific permissions needed to complete a required task. Moreover, a least privileged access policy can too complex to manage conventionally as there are typically frequent policy change requests for each application. Each application can also have its own proxy exception or specific configuration that requires customization. For enterprises, that have a large number of applications but limited manual resource to manage proxy policies, conventional use of the least privileged access therefore leads to application proxies becoming ineffective due over time due to lack of hygiene and context/ownership.

What is therefore needed is a solution that allows enterprises of any size to effectively manage its application traffic configurations on web proxies with limited human resources

SUMMARY OF THE DISCLOSURE

In one aspect, the present disclosure describes a computer-implemented method for management of an application on an enterprise network which accesses external networks via a web proxy. The method comprises obtaining enriched metadata concerning an application executed on the enterprise network, the enriched metadata including at least source code information and ownership information, identifying application traffic on the enterprise network based on proxy log data, source IP and destination URL, generating an access control list (ACL) based on the enriched metadata and identified application traffic, the ACL including a source address of the application and a list of allowed destination addresses, converting the ACL into a proxy policy that can be processed by a web proxy to permit access by the application to the destination addresses in the ACL, and establishing data communication between the application and an external network based on the proxy policy.

In another aspect, the present disclosure describes a computer-implemented method for migrating an application from a first web proxy to a second web proxy. The method comprises
selecting an application for migration from the first web proxy to the second web proxy, obtaining configuration information corresponding to a first proxy policy for the application selected with respect to the first web proxy, converting the first proxy policy to a second proxy policy for providing connectivity for the application selected using the second web proxy, and establishing data communication between the application and an external network based on the second proxy policy.

In still another aspect, the present disclosure describes a system for management of an application on an enterprise network which accesses external networks via a web proxy comprises one or more processors configured with executable instructions for implementing: a) an application metadata enrichment module configured to pull sources of data concerning the application including at least source code information and ownership information, b) a traffic discovery module configured to identify application traffic on the enterprise network based on proxy log data, source IP and destination URL, c) an access control list (ACL) module that combines the enriched metadata and identified application traffic and generates an access control list that includes a source address of the application and a list of allowed destination addresses, d) a provisioning an hygiene module configured to convert the ACL into a proxy policy that can be processed by a web proxy to permit access by the application to the destination addresses in the ACL, and a communication module configured to establish data communication between the application and an external network based on the proxy policy.

These and other aspects, features, and advantages can be appreciated from the following description of certain embodiments and the accompanying drawing figures and claims.

DESCRIPTION OF CERTAIN EMBODIMENTS OF THE DISCLOSURE

The term "module" as used herein is a program unit, executable on one or more processors, that performs a particular task or related group of tasks within a larger software system. This definition expressly includes program units (components) that can stand alone outside the larger software system yet are useful for performing tasks within the software system. A module can include one more sub-modules.

The present disclosure describes a system and method that enables an enterprise network to effectively manage the external connectivity (e.g., to the Internet or an external network via a proxy) of all internal applications executed on an enterprise network. The system provides the ability to seamlessly migrate an application to a new proxy platform. The system also enhances enterprise efficiency and cyber-effectiveness by generating a metadata database that includes application reference data. The metadata database includes a locked-down access control list (ACL) for each application. Control of the metadata database allows application and user configurations to be attested and monitored periodically and also enables automated provisioning of configurations. The methods described herein allow enterprises that employ web proxies as a solution to enable complex internal application flows to the Internet.

Figure 1:
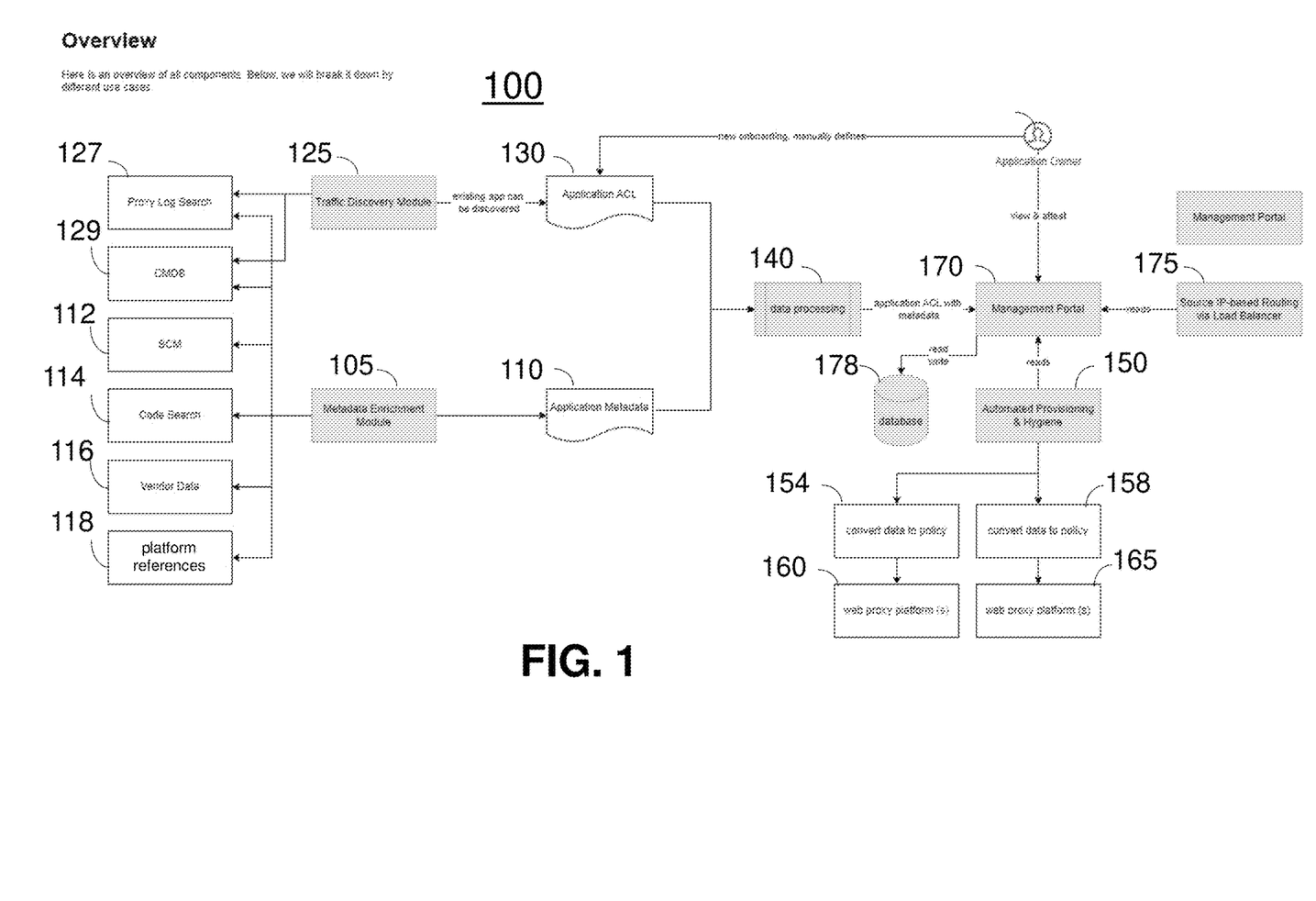
FIG. 1 is a schematic diagram of a system for enterprise application management and migration on a web proxy according to an embodiment of the present disclosure.

FIG. 1 is a is a schematic diagram of a system for enterprise application management and migration on a web proxy according to an embodiment of the present disclosure. Description of the system 100 begins with a metadata enrichment module 105. Metadata enrichment module 105 is configured to pull, as input, metadata associated with an application from a number of identified data sources. The metadata enrichment module 105 processes the metadata and returns, as output, certain specific application metadata 110 including, but not limited to: application ownership information; organizational alignment; the source code management (SCM) repository associated with the application; source code references to and usage of web proxies; application production state; business dependencies; application risk rating; architecture reference(s); vendor data reference(s), and internal compute platform reference(s).

The ownership information pulled by the metadata enrichment module 105 includes he technical and business owners of each application who are responsible for the function of the application. The organizational alignment designates the technical and business organization that owns this application. The organizational alignment can comprise a list of department names with a hierarchy specific to the organizational chart of the relevant enterprise. The SCM repository 112 and source code 114 include a list of source-code management references (e.g., links, pointers, identifiers). These references indicate where the source code of a particular application is stored. This information can comprise the repository name, file name, line number, and offsets that point to the exact location of specific source code. Alternatively, the reference can be a hyperlink to the source code location or search tool, such as SourceGraph, that points directly to the source code reference. The production state comprises information that indicates the current state of the application. As examples the application can be in a state of production, non-production, trial, decommission, and to-be-decommissioned. These states (among others) provide information concerning the state of each application in their respective lifecycles.

Business dependencies include information regarding critical business process dependencies for which the application is considered a component (and/or is utilized). The dependencies can include various platforms of an enterprise such as trading, payment, human resource, audit, regulatory, etc. The application risk rating is a profiling model that classifies software assets according to inherent risk level. The application risk rating is used to prioritize various risk initiatives across, helping to ensure controls are implemented in a structured and prioritized manner. Architecture references concern architectural diagrams of applications that can be obtained from an architecture review session or a C4 model reference. If an application is provided by a vendor, vendor data 116 references constitute data that is associated with the vendor including, but not limited to, vendor name, vendor email address, vendor phone number, and vendor support team. Vendor information can be critical during supply chain attacks. In such events vendor data references are identified rapidly to assess a whether to curtail or disable vendor traffic. Internal compute platform references 118, also referred to as internal hosting data, provide information as to how an application is hosted as well as hosting data such as platform name, server name, and subnet list.

System 100 also includes a traffic discovery module 125. The traffic discovery module 125 is configured to acquire data from a proxy log 127 and a configuration management database (CMDB) 129 and to process this data to determine the owners of traffic ("discovery") based on map source IP and destination URL. This is particularly useful when there are currently applications using web proxy in the enterprise that have not been identified. The traffic discovery module 125 is further configured to trigger a data processing pipeline to sync the source and destination data obtained from the discovery process. Applications that are discovered are added to an application access control list (ACL) 130. The ACL 130 is a policy module that is configured to enable external web connections for an application. According to one implementation, an application ACL 130 consists of a list of internal source Internet Protocol addresses (IPs), a list of external destination uniform resource locators (URLs), and a hypertext transport protocol (HTTP) method. Once an ACL is defined it is provisioned on the web proxy to allow the hosts (source IP addresses) to access external URLs as defined in the ACL's external URL list. More particularly, the ACL 130 contains a source IP list including a list of IP address, subnets, or FQDN at which the traffic for an application originates and a destination URL list which includes the external URLs the application requests access to; the HTTP method includes GET, POST, PUT, PATCH, DELETE, OPTION, etc. If a share compute infra is used, the source IP can be a referenced object list that is dynamically updated.

By default, the enterprise web proxy solution for application traffic is configured to deny all traffic that has a potential to cause data leakage or other cybersecurity issues. To automatically provision the application traffic for the entire enterprise network, the system 100 includes a data processing module 140 that combines the application metadata 110 as enriched by the metadata enrichment module 105 with the ACL information 130 into a format that can be utilized by an automated provisioning and hygiene module 150. The automated provisioning module 150 converts the data received from processing module 140 into proxy policies e.g., 154, 158. The proxy policies 154, 158 are converted into a format that can be processed by various web proxies e.g., 160, 165 as described in commonly-assigned and co-pending U.S. patent application Ser. No. 18/533,768, entitled "Multi-Vendor Web Security Control Integration and Management Platform," which is incorporated by reference herein in its entirety.

As an application is mapped using the metadata (profile) obtained from the configuration management database 127, the data types that the application uses and transfers during operation are identified. With this information, data loss prevention (DLP) policies can be generated for each application to prevent false-positive blocks. For example, an application that uploads sensitive personal identification information (PII) for regulatory/audit purposes can be associated with a DLP policy that allows PII uploads from a source IP of the application to a list of permitted destination URLs.

The automated provisioning module 150 is also configured to identify the owner and organization associated with each application provisioned. After automated configuration by the provisioning module 150, an owner of the application is notified to attest (verify) the configurations and usages (traffic permissions, etc.) set for the application. The notifications to the owners can be set to issue periodically so that updates and modifications to configurations can be attested within a set time period. Additionally, the automated provisioning module is configured to monitor application traffic for any selected application based on the proxy traffic log 127 to ensure that application policy usage is correct and to further ensure that no unapproved traffic originates from the application source IP. If there are exceptions configured for an application, the automated provisioning module 150 is configured to access the risk score of an application to determine the exposure of the application to certain risks. With vendor data referenced, mode 150 can also quickly disable application traffic if there is a supply chain attack on a given vendor. Additionally, the automated provisioning module 150 ensures that policies are up to date by automatic data synchronization and removal of the proxy platform during migrations or reconfigurations.

A management portal 170 receives data from data processing module 140 and also receives source-IP based routing traffic via a load balancer 175. The management portal 170 is the main platform for user interaction and provides functionality for enabling users to onboard new applications, view existing application policies, manage application policies (including updating and modification of policies), configure exceptions, review usage and/or risk scores, and perform attestation upon notification. The management portal 170 reads data from and writes data to a database 178 which is a NoSQL database (e.g., MongoDB) that stores the configuration and metadata. The database 178 can be used to store SSL (Secure Socket Layer) certificates for application traffic.

The load balancer 175 is coupled to both (e.g., between) the application traffic and web proxy platform 160, 165 to route the application traffic to the appropriate proxy 160, 165 according to the source IP addresses of the application traffic. For example, a set of applications can use a cloud-dedicated proxy platform and the load balancer 175 can route the application traffic to use the cloud proxy based on the source IP addresses of the application. Other sets of applications can be routed to use a default proxy based on their source IP addresses. The load balancer 175 can also be used for migrating applications from one proxy platform to another, by modifying the IP based routing between proxy platforms.

Figure 2:
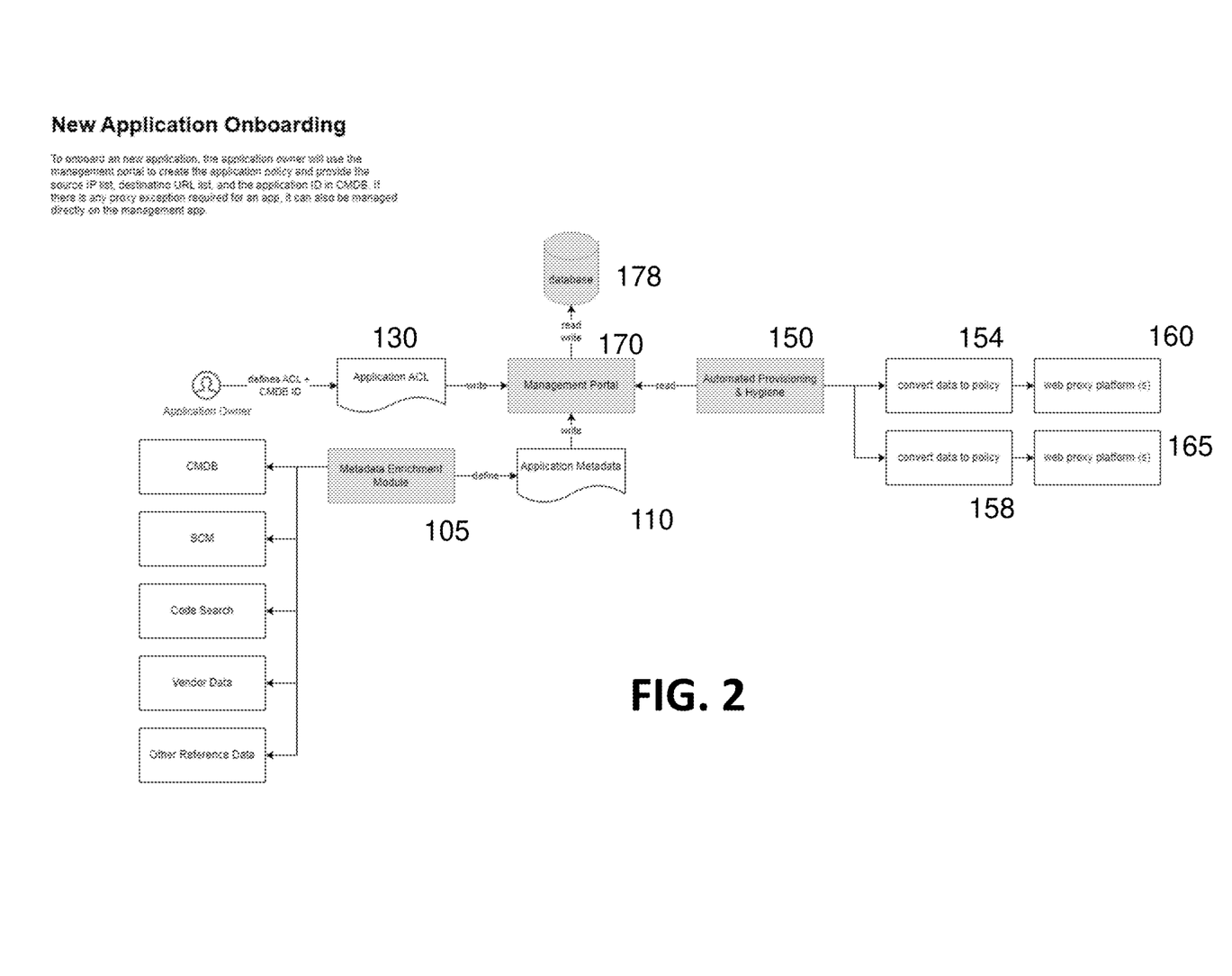
FIG. 2 is a schematic diagram of a system for enterprise application management and migration on a web proxy according to an embodiment of the present disclosure that illustrates application onboarding.

To onboard a new application, an application owner uses the management portal 170 to create an application policy for the new application. The application owner also enters a source IP list 112, destination URL list and the application ID (in CMDB 129) into the management poral 170. If a proxy exception is required for the application, the exception can be provided and managed using the management portal 170. This process is illustrated in FIG. 2 in which management portal 170 plays a central role. In particular, to onboard a new application, an operator uses management portal 170 to provide an application access control list (ACL) 130 for the new application as well as an application identification (ID). As noted above, the ACL 130 is a policy module that is configured to enable external web connections for an application. The management portal 170 also pulls application metadata 100 defined by the application metadata enrichment module 105. Additionally, the management portal 170 reads configurations from the automatic provisioning module 150. The management portal 170 combines and saves the information that is entered in database 178 which stores the metadata of the onboarded application in a readily accessible form.

Figure 3:
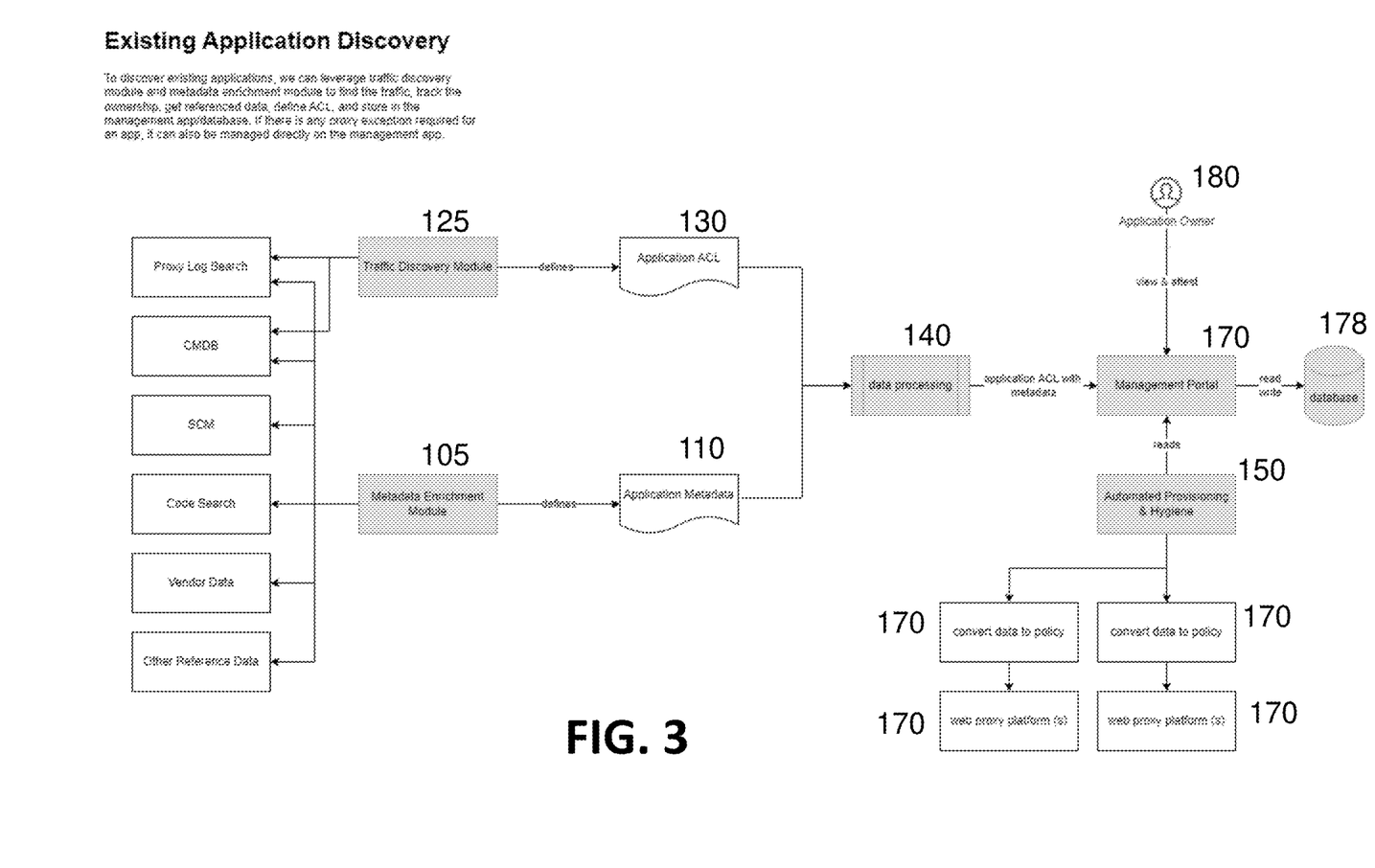
FIG. 3 is a schematic diagram of a system for enterprise application management and migration on a web proxy according to an embodiment of the present disclosure that illustrates existing application discovery.

FIG. 3 is a schematic diagram of a system for enterprise application management and migration on a web proxy according to an embodiment of the present disclosure that illustrates existing application discovery. In this use case, the management portal 170 orchestrates the acquisition of information from the traffic discovery module 125 which monitors traffic and obtains access control lists 130 for each discovered application based on application ID. Additional streams of data are obtained from application metadata 110 delivered by the application metadata enrichment module 105. Management portal 170 pulls additional configuration data from the automated provisioning and hygiene module 140. Once this information is gathered, an operator 180 can view all information gathered on discovered application traffic and can attest to the accuracy of configuration and usage. This process can be performed periodically to maintain the hygiene of proxy access for application traffic.

Figure 4:
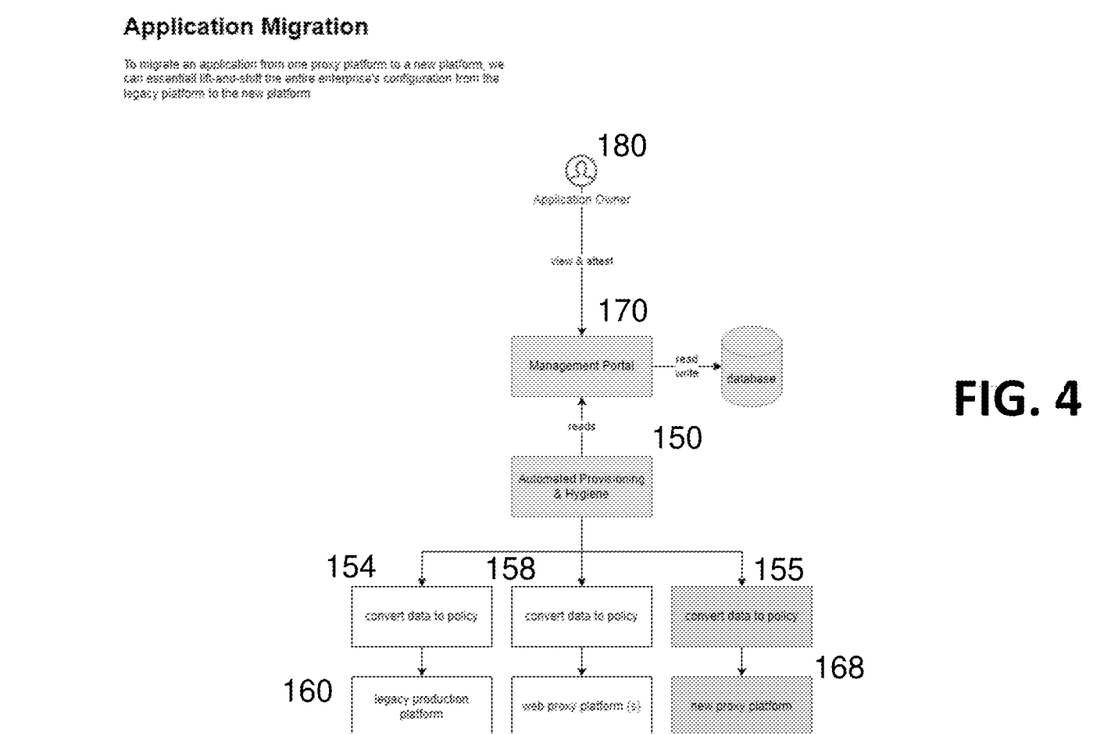
FIG. 4 is a schematic diagram illustrating the parts of the system shown in FIGS. 1-3 used in preforming an application migration.

FIG. 4 is a schematic diagram illustrating the parts of the system shown in FIGS. 1-3 used in performing an application migration. To migrate an application from a legacy proxy platform to a new platform, the enterprise configuration can be effectively lifted and shifted from the legacy platform to the new platform. In this use case, an operator 180 selects an application for migration in the management portal 170. The management portal 170 then obtains the configuration of the selected application and arranges a conversion of the current proxy policy e.g., 154, 158 of the selected application in the legacy platform e.g., 160, 165 to a new policy 155 in the new platform 168.

The system and methods described herein provide a number of benefits. By making application configuration and traffic usage available to operators in a single platform, security and infrastructure teams have full visibility of all enterprise applications that require and use internet connectivity. Migrations are implemented in a seamless and efficient manner by lifting and shifting platform-agnostic data and pushing such data to the new infrastructure. The migrations are performed without any action required by the application owners by adding new IP routing rules on the load balancer using managed configurations.

Additionally, supply chain attacks can be remediated based on vendor reference data which enables vendor application access to be inactivated rapidly. Provisioning and hygiene maintenance are performed automatically to all in-scope downstream platforms with no manual intervention. The proxy policies of each application are periodically attested by their respective owners to ensure effectiveness and application policies are removed if no longer required.

More generally, the system allows enterprises of any size to effectively manage its application traffic configuration on web proxies with limited human resources. The system can automatically discover existing applications and onboard new applications. Any decision and action can be taken based on the attributes of an application at scale. The external connections of an enterprise are made secure and constrained to follow a least-privileged access principle with periodic attestation to ensure the effectiveness of enterprise security policy. From a security perspective, internet access for applications are fully determined. Each application has it's a specific configuration and exception. If an application is compromised or abused, the impact of such tampering is contained and limited.

The methods and processes described herein are performed by multiple computing devices (e.g., user devices, physical servers, workstations, storage arrays, cloud computing resources, etc.) that communicate and interoperate over one or more networks to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices can be, but need not be, co-located. The results of the disclosed methods and tasks can be persistently stored by transforming physical storage devices, such as solid-state memory chips or magnetic disks, into a different state. In some embodiments, the computer system may be a cloud-based computing system whose processing resources are shared by multiple distinct business entities or other users.

The methods described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium.

The modules described herein which are executed on one or more computing devices and information processors which can communicate with other information processors within the organization and outside of the organization (e.g., to proxy vendor services) using data connections over a data network. Data connections can be any known arrangement for wired (e.g., high-speed fiber) or wireless data communication, using any suitable communication protocol, as known in the art.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the disclosure has been described with reference to exemplary embodiments, it will be understood by those skilled in the art that various changes may be made and equivalents may be substituted for elements thereof without departing from the scope of the disclosed invention. In addition, many modifications will be appreciated by those skilled in the art to adapt a particular instrument, situation or material to the teachings of the disclosure without departing from the essential scope thereof. Therefore, it is intended that the invention not be limited to the particular embodiment disclosed as the best mode contemplated for carrying out this invention, but that the invention includes all embodiments falling within the scope of the appended claims.

What is claimed is:

1. A computer-implemented method for management of an application on an enterprise network which accesses external networks via a web proxy comprising:
    obtaining enriched metadata concerning an application executed on the enterprise network, the enriched metadata including at least source code information and ownership information;
    identifying application traffic on the enterprise network based on proxy log data, source IP and destination URL;
    generating an access control list (ACL) based on the enriched metadata and identified application traffic, the ACL including a source address of the application and a list of allowed destination addresses;
    converting the ACL into a proxy policy that can be processed by a web proxy to permit access by the application to the destination addresses in the ACL; and
    establishing data communication between the application and an external network based on the proxy policy and;
    receiving an application access control list and an application identifier for an application to be onboarded for a web proxy;
    combining the access control list with enriched application metadata and additional application configurations; and
    storing the combined data access control list, enriched application metadata and additional application configurations in a database.

2. The computer-implemented method of claim 1, wherein the enriched metadata includes application ownership data, organization alignment data, source-code management repository references, application production state information, application-related business dependency data, an application risk rating, vendor reference data, and internal hosting data.

3. The computer-implemented method of claim 1, further comprising receiving and storing proxy exceptions for the application to be onboarded.

4. The computer-implemented method of claim 1, further comprising notifying an owner of the application to attest configurations and usages set for the application.

5. The computer-implemented method of claim 1, further comprising identifying data types that an application uses and transfers during operation; and 15 creating a data loss prevention (DLP) policy for the application to prevent false-positive blocks using the identified data types.

6. The computer-implemented method of claim 1, further comprising monitoring application traffic for any selected application using the proxy log data including the source IP of the application.

7. The computer-implemented method of claim 6, further comprising detecting unapproved traffic originating from the source IP of the selected application during monitoring of the application traffic of the selected application.

8. A system for management of an application on an enterprise network which accesses external networks via a web proxy: one or more hardware processor configured with executable instructions stored in memory for
- an application metadata enrichment module configured to pull sources of data concerning the application including at least source code information and ownership information;
- a traffic discovery module configured to identify application traffic on the enterprise network based on proxy log data, source IP and destination URL;
- an access control list (ACL) module that combines the enriched metadata and identified application traffic and generates an access control list that includes a source address of the application and a list of allowed destination addresses;
- a provisioning an hygiene module configured to convert the ACL into a proxy policy that can be processed by a web proxy to permit access by the application to the destination addresses in the ACL; and
- a communication module configured to establish data communication between the application and an external network based on the proxy policy and
- a management portal through which information is input from an operator including an application access control list and an application identifier for the application to be onboarded for a web proxy, the management portal further being configured to combine the access control list with enriched application metadata and additional application configurations; and a database for storing the combined data access control list, enriched application metadata and additional application configurations received from the management portal;
- wherein the application metadata enrichment module, a traffic discovery module, access control list (ACL), provisioning hygiene module, the communication module and the management portal are implemented using the one or more hardware processor coupled to the memory.

9. The system of claim 8, wherein the data pulled by the metadata enrichment module includes application ownership data, organization alignment data, source-code management repository references, application production state information, application-related business dependency data, an application risk rating, vendor reference data, and internal hosting data.

10. The system of 8, wherein the management portal is configured to receive proxy exceptions for the application to be onboarded and to store the proxy exceptions in the database.

11. The computer-implemented method of claim 1, wherein the provisioning and hygiene module is further configured to notify an owner of the application to attest configurations and usages set for the application.

\* \* \* \* \*